(12) United States Patent
Rijsdijk

(10) Patent No.: US 6,305,745 B1
(45) Date of Patent: Oct. 23, 2001

(54) CHILD'S SEAT

(75) Inventor: Gert Ariën Luc Rijsdijk, Eindhoven (NL)

(73) Assignee: Maxi Miliaan B.V. (NL)

(*) Notice: Subject to any disclaimer, the term of this patent is extended or adjusted under 35 U.S.C. 154(b) by 0 days.

(21) Appl. No.: 09/230,789

(22) PCT Filed: Aug. 6, 1997

(86) PCT No.: PCT/NL97/00455

§ 371 Date: Jun. 30, 1999

§ 102(e) Date: Jun. 30, 1999

(87) PCT Pub. No.: WO98/06596

PCT Pub. Date: Feb. 19, 1998

(30) Foreign Application Priority Data

Aug. 9, 1996 (NL) .................................................. 1003773

(51) Int. Cl.[7] .................................................. B60N 2/28
(52) U.S. Cl. ................................ 297/250.1; 297/483
(58) Field of Search ........................... 297/481, 250.1, 297/256.1, 484, 483, 468

(56) References Cited

U.S. PATENT DOCUMENTS

| | | | |
|---|---|---|---|
| 3,076,679 | * | 2/1963 | Lorber .............................. 297/481 |
| 3,096,122 | * | 7/1963 | Connell ............................ 297/481 |
| 3,117,818 | * | 1/1964 | Fredericks ..................... 297/481 X |
| 3,144,274 | * | 8/1964 | Harris ............................... 297/481 |
| 3,178,224 | * | 4/1965 | Anderson et al. ............... 297/481 |
| 3,244,452 | * | 4/1966 | Veley et al. ...................... 297/481 |
| 3,401,980 | * | 9/1968 | Nicholas .......................... 297/481 |
| 3,485,529 | * | 12/1969 | Marling ............................ 297/481 |
| 3,679,228 | * | 7/1972 | Settimi ......................... 297/481 X |
| 3,740,094 | * | 6/1973 | Hornyak .......................... 297/481 |
| 3,992,056 | * | 11/1976 | Koziatek et al. .......... 297/250.1 X |
| 4,685,741 | | 8/1987 | Tsuge et al. . |
| 4,687,254 | * | 8/1987 | Baumert et al. ................ 297/481 |
| 4,789,179 | * | 12/1988 | Takahashi .................... 297/481 X |
| 4,915,446 | | 4/1990 | Darling et al. . |
| 5,044,695 | * | 9/1991 | Tsuchiya ......................... 297/481 |
| 5,524,964 | * | 6/1996 | Weimersheimer .......... 297/256.1 X |
| 5,524,965 | * | 6/1996 | Barley .......................... 297/256.16 |
| 5,580,126 | * | 12/1996 | Sedlack ..................... 297/250.1 X |
| 5,678,887 | * | 10/1997 | Sher .............................. 297/250.1 |
| 5,775,772 | * | 7/1998 | Lefranc ......................... 297/250.1 |

FOREIGN PATENT DOCUMENTS

| | | |
|---|---|---|
| 0251305A2 | 1/1988 | (EP) . |
| 0295838A1 | 12/1988 | (EP) . |
| 0656285A1 | 6/1995 | (EP) . |

OTHER PUBLICATIONS safe–n–sound, "Baby Safety Capsule—Instructions for Installation and Use", declaration by protestor from the public, p. 10, 1992.*

* cited by examiner

Primary Examiner—Peter R. Brown
(74) Attorney, Agent, or Firm—Patterson, Thuente, Skaar & Christensen, P.A

(57) ABSTRACT

A child's seat comprising a back support, a seat and interconnectable belts. The seat is provided with at least one storage element, to which a belt, which has been disconnected from the other belts, can be detachably attached. The storage element is positioned outside the part of the child's seat on which or against which a child being placed in the seat sits or rests.

3 Claims, 3 Drawing Sheets

CHILD'S SEAT

The invention relates to a child's seat comprising a back support, a seat and interconnectable belts.

In a similar child's seat known from European Patent Application EP-A1-0 295 838 two belts are laid over the child's shoulders upon placing the child in the child's seat, after which the belts are connected to a buckle by means of so-called belt tongues. The belt is fixed to the seat near the child's crotch by means of a belt.

A drawback of such a known seat is the fact that the belts and the belt tongues connected thereto lie loose in the seat prior to placing the child in the seat. As a result of this the child will be positioned on top of the belts, after which the belts must be removed from under the child, or an adult engaged in placing the child in the seat must first arrange the belts so that the child can be placed in the seat without impediment.

The object of the invention is to provide a child's seat wherein the above drawbacks are avoided.

This objective is accomplished with the child's seat according to the invention in that said seat is provided with at least one storage element, to which a disconnected belt can be detachably attached, whereby the storage element is positioned outside a part of the child's seat that is occupied by the child present in the child's seat.

The storage element must be disposed beyond the child's seat or back portion. By attaching the belt to the storage element, the belt is temporarily stored at a position which is known in advance. When a child is being secured in the child's seat, the belt is detached from the storage element, after which the belt can be connected to the other belts. When the child is being taken out of the seat, the belt is connected to the storage element by hand again.

It is noted that from European Patent Application EP-A1-0 656 285 a child's seat is known wherein the belts can be stored near the shoulder portion by means of a retracting roll. A drawback of this arrangement is the fact that it causes the belts to be pulled against the back support, as a result of which the child will be positioned with its back against the belts upon being placed in the child's seat. In addition to that a mechanism of this type is relatively costly.

In one embodiment of the child's seat the interconnectable belts comprise two side belts, which are each connected to the child's seat near a shoulder part with a first end and near the seat with a second end. The belts comprise a third central belt, which is connected to the child's seat near the center of the seat with a first end, and which can be detachably connected to said side belts between said first and said second ends of said side belts with its second end.

The child's seat according to the invention is characterized in that the child's seat is provided on either side of the side belts with a storage element, whereby each disconnected side belt can be detachably attached to one of said storage elements.

In this manner the side belts can be readily stored near the sides of the child's seat, as a result of which a child being placed in the child's seat cannot sit with its back against the belts.

Another embodiment of the child's seat according to the invention is characterized in that in that said storage element is secured to a side support connected to the back support.

Such a storage element is readily accessible, whilst the storage element will not impede the child present in the seat.

Yet another embodiment of the child's seat according to the invention is characterized in that said storage element is a hook.

A hook can be formed on the seat in a simple manner, whereby the belt or the belt tongue connected to the belt can be suspended from the hook.

It is noted that from U.S. Pat. No. 3,992,056 a child's seat comprising hook-shaped slots 45, 47 is known. Said slots are intended for guiding the seat belt present in a car, however, and not for storing the belts provided in the child's seat.

The invention will be explained in more detail hereafter with reference to the drawing, in which.

Like parts are numbered alike in the Figures.

Figure 1:
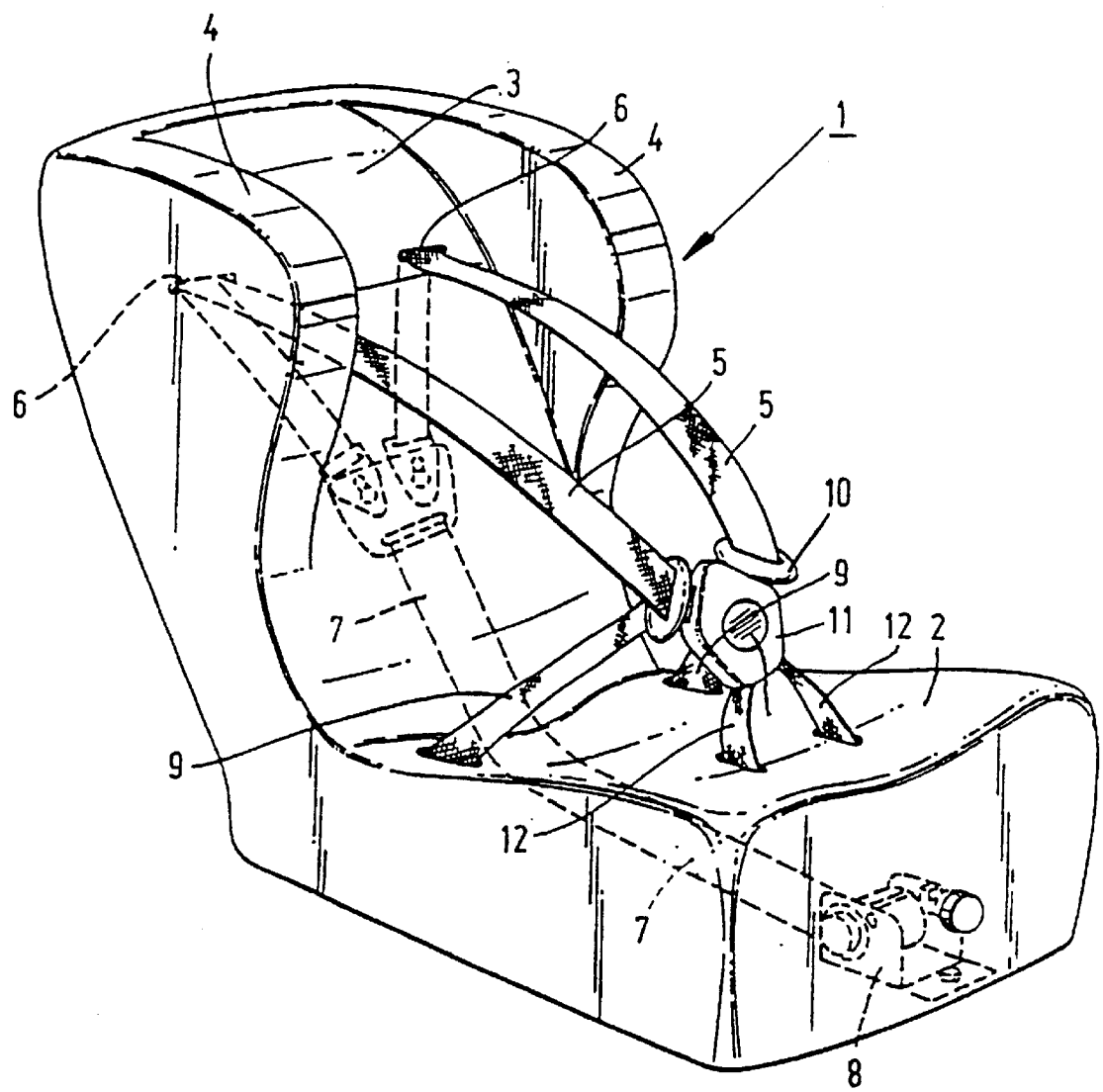
FIG. 1 is a perspective view of a child's seat according to prior art.

FIG. 1 shows a child's seat 1 known per se, which comprises a seat 2 and a back support 3 connected thereto. Back support 3 is on either side bounded by side supports 4. Child's seat 1 is provided with two shoulder belts 5, which are connected to a tensioning belt 7 via openings 6 in back support 3. Tensioning belt 7 is passed through a clamping device 8 with an end remote from belts 5, by means of which clamping device tensioning belt 7 can be fixed in a desired position. Belts 5 are connected to seat 2 of child's seat 1 with their ends 9 remote from tensioning belt 7. Each belt 5 is provided with a so-called belt tongue 10, which is positioned between the first end of belt 5, which is located near the shoulder part, and the second end of belt 5, which is located near the seat, and which can be detachably connected to a buckle 11. Buckle 11 is connected to seat 2 of child's seat 1 by means of two central belts 12. Buckle 11 is provided with a pushbutton 13, by means of which belt tongues 10 can be disconnected from buckle 11. After being disconnected from buckle 11, belts 5 and the belt tongues 10 connected thereto lie on seat 2 and against back support 3 of child's seat 1. When a child is being placed in child's seat 1, the child will be positioned on top op belts 5, or an adult engaged in placing the child in the child's seat will have to see to it that belts 5 are removed from under the child.

Figure 2:
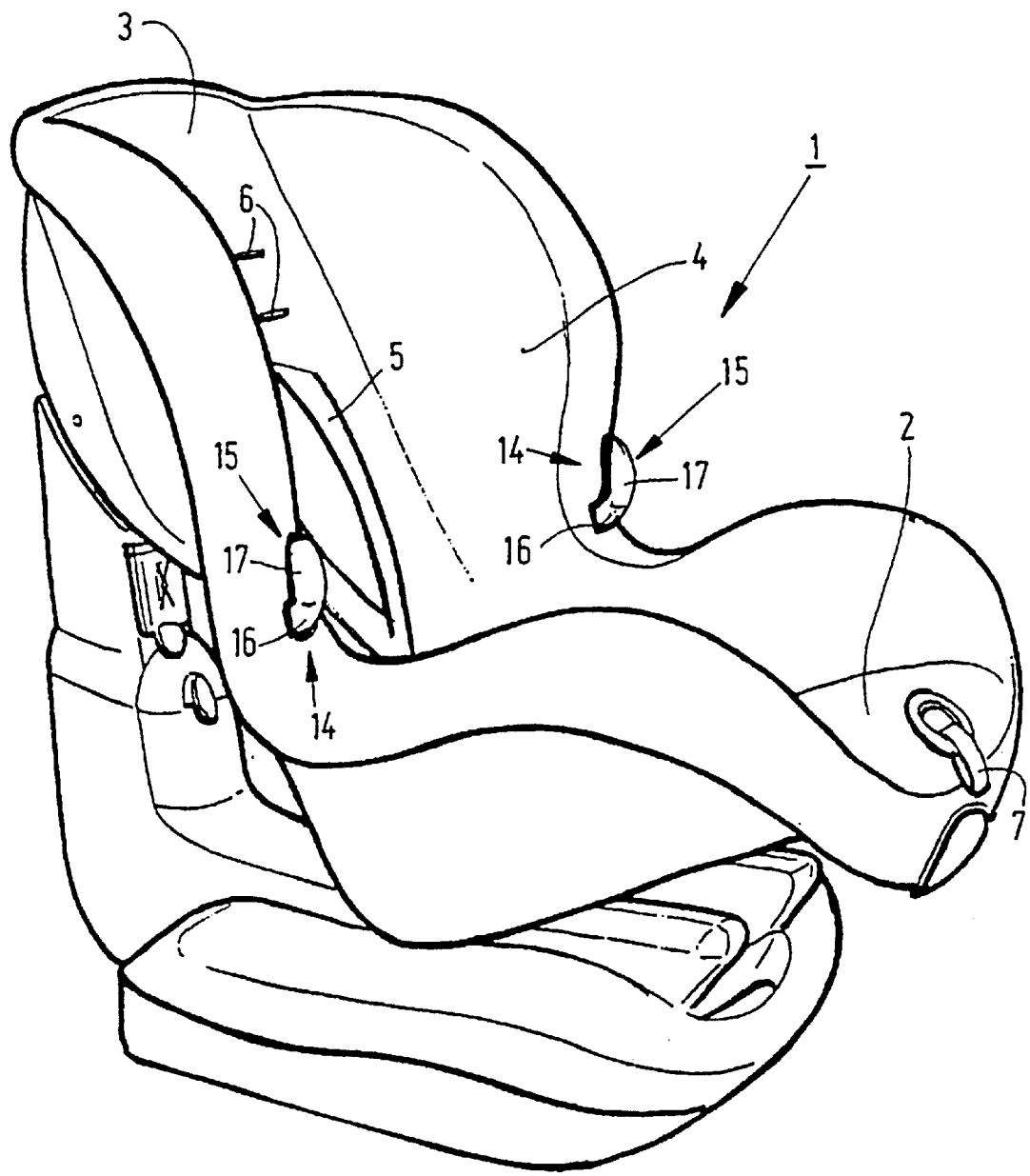
FIG. 2 shows a child's seat according to the invention.

FIG. 2 shows a child's seat according to the invention, which is provided on either side of back support 3 with side supports 4, whereby each side support 4 is provided with a storage element 14, which will be explained in more detail with reference to FIG. 3. Storage element 14 is preferably positioned on side support 4 of the child's seat at a level between said first and said second end of belt 5.

Figure 3:
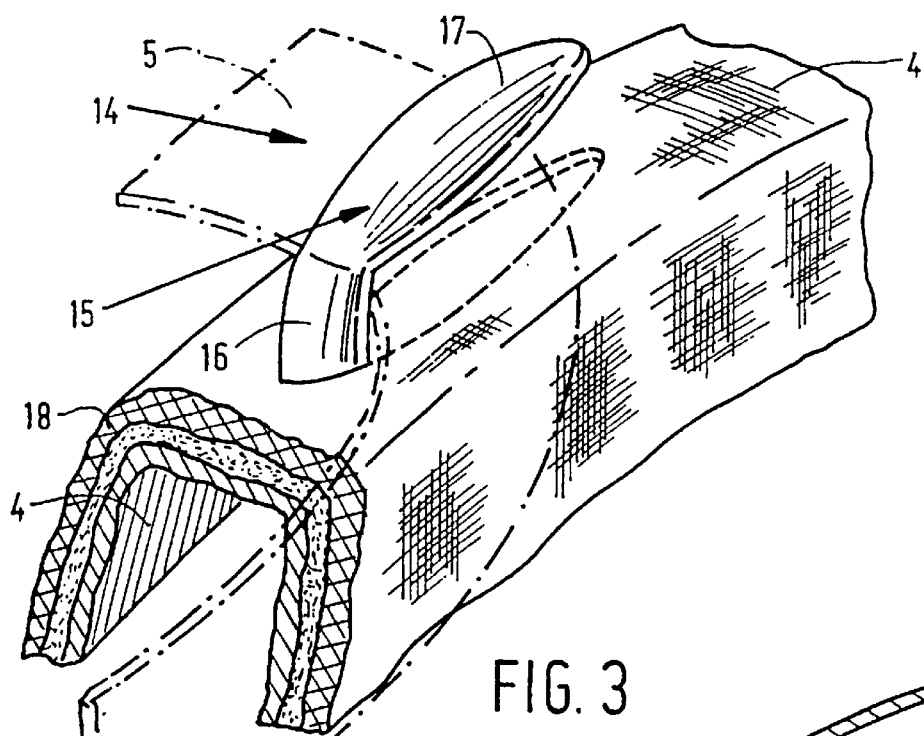
FIG. 3 is a perspective view of a storage element of a child's seat according to the invention.

FIG. 3 is a perspective view of a part of the side support 4 of child's seat 1 according to the invention, which is provided with a storage element 14. Storage element 14 comprises a hook 15 formed on side support 4, which hook comprises a spacer 16, which extends transversely to side support 4, and a plate-shaped part 17. Plate-shaped part 17 is connected to spacer 16 on a side remote from side support 4. Hook 15 and side supports 4 can be formed in one piece from plastic material. The entire child's seat 1 is upholstered with a material 18, which extends over side supports 4, with hook 15 projecting through said material.

Figure 4:
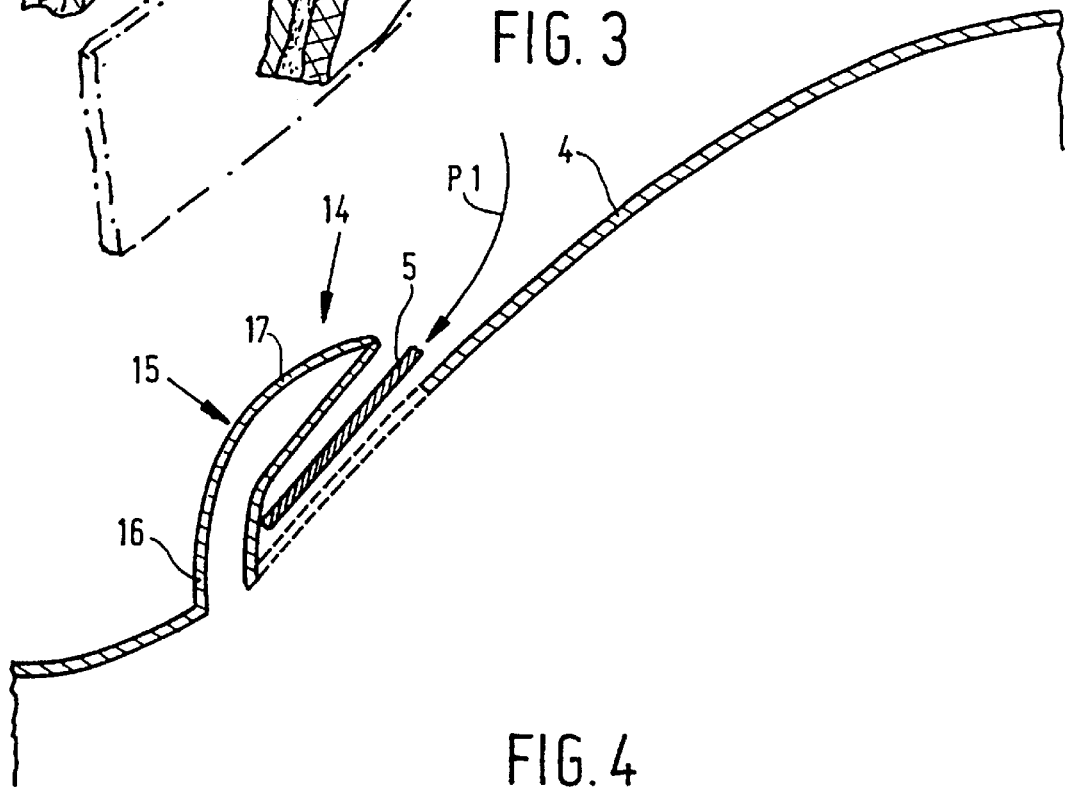
FIG. 4 is a side view of the storage element shown in FIG. 3.

FIG. 4 is a side view of the storage element 14 that is shown in FIG. 2. After belt tongue 10 has been disconnected from buckle 11, belt 5 is slid into hook 15 in a direction indicated by arrow P1, thus removing belt 5 from that part of child's seat 1 on which the child is seated or against which it rests with its back.

It is also possible to suspend belt tongue 10 from hook 15.

Furthermore it is possible to provide belt 5 and upholstery 18 of child's seat locally with mating VELCRO portions instead of providing a hook 15.

Furthermore it is possible to provide belt 5 with a press fastener and to provide the child's seat with a counterpart which co-acts with said press fastener. Said counterpart must be mounted on child's seat 1 at such a location that belt 5 will no longer be positioned on seat 2 after the counterpart has been connected to the press fastener.

It is also possible to provide a magnet on an edge of the child's seat, to which the metal belt tongue can be attached by magnetic force.

Furthermore it is possible to provide a slot in an edge of the child's seat, into which a belt tongue can be inserted.

What is claimed is:

1. A child's seat comprising:
    a back support having a shoulder part and a two side supports;
    a seat operably attached to the back support;
    interconnectable belts that comprise:
        two side belts that are each connected to the shoulder part with a first end and proximate the seat with a second end; and
        a third central belt connected proximate a center of the seat with a first end and detachably connected to the side belts between the first and second ends with a second end; and
    two storage elements that each comprise a hook secured to one of the side supports, wherein each of the storage elements is adapted to receive and retain therein one of the side belts, wherein the storage elements thereby retain the side belts outside a part of the child's seat that is occupied by a child present in the child's seat, wherein each of the storage elements comprises:
        a spacer that extends transversely to the side support; and
        a plate-shaped part connected to the spacer remote from the side support, wherein the side support, the spacer and the plate-shaped part define a recess that is adapted to receive one of the side belts.

2. The child's seat of claim 1, wherein the storage elements are each fabricated from plastic.

3. The child's seat of claim 2, wherein the back support and the seat are substantially covered with upholstery, and wherein the storage elements extend through the upholstery.

* * * * *